(12) United States Patent
Pan et al.

(10) Patent No.: US 7,953,916 B2
(45) Date of Patent: May 31, 2011

(54) DYNAMIC, LOCAL RETRIGGERED INTERRUPT ROUTING DISCOVERY METHOD

(75) Inventors: Jacob Pan, Olympia, WA (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 12/420,685

(22) Filed: Apr. 8, 2009

(65) Prior Publication Data

US 2010/0262737 A1 Oct. 14, 2010

(51) Int. Cl.
*G06F 13/24* (2006.01)
(52) U.S. Cl. ........................................................ 710/268
(58) Field of Classification Search ............ 710/260–269
See application file for complete search history.

(56) References Cited

U.S. PATENT DOCUMENTS

| | | | |
|---|---|---|---|
| 5,283,904 A * | 2/1994 | Carson et al. .................. | 710/266 |
| 5,530,891 A * | 6/1996 | Gephardt .......................... | 710/8 |
| 5,745,763 A * | 4/1998 | Mealey et al. ................. | 719/321 |
| 6,779,069 B1 * | 8/2004 | Treichler et al. .............. | 710/305 |
| 6,901,523 B2 * | 5/2005 | Verdun .......................... | 713/320 |
| 6,950,894 B2 * | 9/2005 | Tan et al. ...................... | 710/300 |
| 7,310,742 B2 * | 12/2007 | Zimmer et al. ................... | 714/5 |
| 7,366,814 B2 * | 4/2008 | Shimizu et al. ................ | 710/268 |
| 7,546,409 B2 * | 6/2009 | Gough et al. ................. | 710/313 |
| 2005/0138249 A1 * | 6/2005 | Galbraith et al. ............. | 710/100 |
| 2006/0005070 A1 * | 1/2006 | Zimmer et al. .................. | 714/5 |
| 2007/0168574 A1 * | 7/2007 | Martinez et al. ................ | 710/15 |

* cited by examiner

*Primary Examiner* — Paul R Myers
(74) *Attorney, Agent, or Firm* — Joni D. Stutman

(57) ABSTRACT

In some embodiments, the invention involves a dynamic interrupt route discovery method with local APIC (Advanced Programmable Interrupt Controller) retriggering to accommodate architectures that are not PC/AT compatible. In a mobile Internet device (MID) General Purpose Input/Output (GPIO) pins are dynamically allocated and IRQs are retriggered by a GPIO driver to multiplex the requests to an appropriate device. Other embodiments are described and claimed.

20 Claims, 4 Drawing Sheets

DYNAMIC, LOCAL RETRIGGERED INTERRUPT ROUTING DISCOVERY METHOD

FIELD OF THE INVENTION

An embodiment of the present invention relates generally to mobile computing systems and, more specifically, to a dynamic interrupt route discovery method with local APIC (Advanced Programmable Interrupt Controller) retriggering to accommodate architectures that are not PC/AT compatible.

BACKGROUND INFORMATION

Various mechanisms exist for generating and servicing interrupts. Most methods have been developed for PC/AT compatible processors, however. With the advent of new, low power, mobile processors, such as those used in mobile Internet devices, these standard methods of dealing with interrupts are no longer viable or efficient.

For instance, emerging Intel® Atom™ processor-based MID (Mobile Internet Device) platforms no longer resemble the PC/AT I/O complex, but the ability to leverage existing operating system (OS) infrastructure and have reusable device drivers across variations of OEM (Original Equipment Manufacturer)/ODM (Original Device Manufacturer) platforms presents a key challenge to developing new software and services for these new platforms. The value of 'compatibility' for the PC is not just the IA32 instruction set, but also the platform hardware topology. Compatibility leads to running shrink-wrap software compatible with older operating systems, such as DOS, through to recently released operating systems such as Microsoft® Vista®. These operating systems depend upon the PC/AT hardware complex, including but not limited to the interrupt controller.

BRIEF DESCRIPTION OF THE DRAWINGS

The features and advantages of the present invention will become apparent from the following detailed description of the present invention in which.

DETAILED DESCRIPTION

An embodiment of the present invention is a system and method for dynamic interrupt route discovery using local APIC (Advanced Programmable Interrupt Controller) retriggering to accommodate architectures that are not PC/AT compatible. In at least one embodiment, the present invention is intended to address a system software/platform solution to address the lack of a PC/AT-style device interrupt complex. Reduced instruction set computers (RISC) non-x86 kernel trees branch and diverge severely within each architecture. For instance, the Linux kernel advanced RISC machine (ARM) tree has 40+ board specific directories, whereas x86 has only one. Embodiments of the present invention help minimize platform-specific kernel modifications.

A platform that does not use an embodiment of dynamic triggering of interrupt routing will need to utilize static firmware tables that need to be rewritten whenever a new device is added to the platform, requiring additional overhead for OEMs. Existing PC/AT platforms using peripheral component interconnect (PCI) buses have four (4) dedicated pins for interrupt requests (IRQs). MIDs typically will have no PCI pins. The General Purpose Input/Output (GPIO) pins of the newer MIDs may be multiplexed and can be assigned for different purposes. Thus, the OEM may reassign the GPIO pins, as needed, to route peripheral device interrupts.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
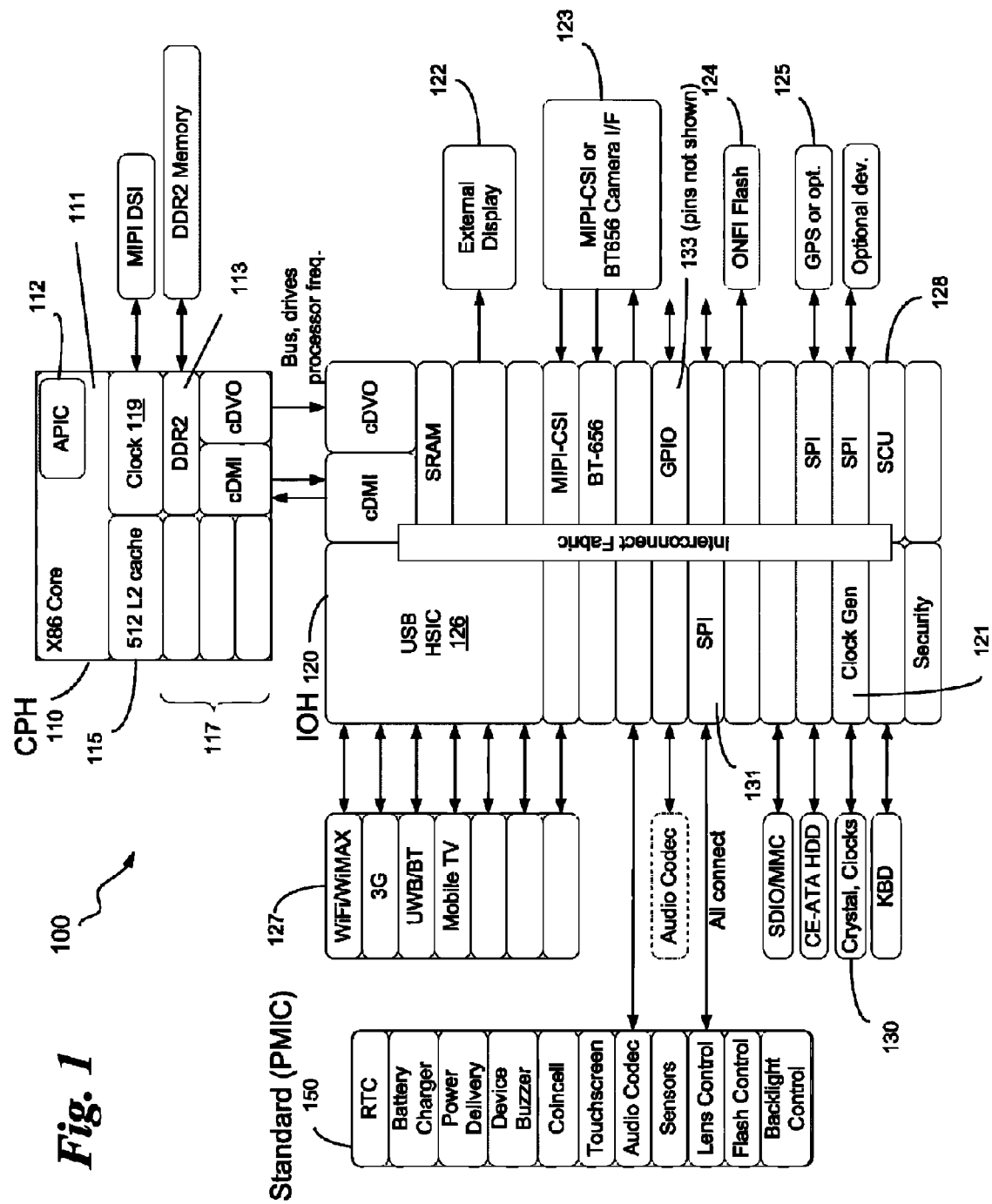
FIG. 1 is a block diagram of an exemplary mobile Internet device, according to an embodiment of the invention.

In an exemplary MID platform, as shown in FIG. 1, the lack of (a) Advanced Configuration and Power Interface (ACPI) compatibility with its ability to describe non-enumerable resources; (b) PCI with its ability to produce self-describing/discoverable hardware, and a (c) traditional PC/AT basic input output system (BIOS) is making device enumeration and probing on these new platforms difficult. More information on ACPI may be found on the public Internet at URL www*acpi*info, where periods have been replaced with asterisks in URLs in this document to prevent inadvertent hyperlinks. More information on PCI may be found at URL www*pcisig*com/home.

The PCI based device enumeration and IRQ routing in existing systems rely on firmware provided system tables (e.g. ACPI PRT) for static IRQ routing. Some platforms introduced emulated IOAPIC and synthetic PCI memory mapped configuration space, but this technique heavily relies on the system controller firmware to identify and perform IRQ forwarding. The firmware approach is static and introduces long interrupt latency and the complexity with inter-processor communications (IPC) between host Intel Architecture (IA) and system controller. Embodiments of the present invention take advantage dynamic IRQ routing discovery which encompass all variations among OEM platforms. This dynamic discovery also allows IRQ balancing via local retriggering. Performance-wise, the scanning of GPIO interrupt status is handled in the IA host, which is much faster than if implemented in system controller firmware. The result is low latency interrupt delivery, which is the important to applications such as for network transactions.

The introduction of a "synthetic" input output Advanced Programmable Interrupt Controller (IOAPIC) and PCI memory mapped configuration space described by the system controller unit (SCU) firmware in the new input/output hub (IOH) architecture is a first step to make MID platform devices "look" PCI compatible. However, many of these south bridge-type devices are connected via low speed peripheral buses such as serial peripheral interface (SPI), whereas their interrupts are routed via General Purpose Input/ Output (GPIO) pins. This implies that many peripheral devices have to share the GPIO block which can be assigned arbitrarily per each OEM/ODM. In addition, an exemplary IOH GPIO block only has one common interrupt routed via the synthetic IOAPIC upstream. The discovery of the mapping among GPIO pins, platform devices, and unique interrupt vector has made writing a platform-neutral driver difficult. The traditional solution via ACPI interrupt request (IRQ) routing table is not available. Further, this table is static, which requires each OEM to implement firmware changes to reflect devices choices. Also, OEM tables are vulnerable to modification by errant modules such as option ROM's or kernel-mode malware. Embodiments of the invention, through programmatic interaction with the platform hardware, eliminate this OEM data table dependency. Embodiments of the present invention solve the problem above by using a dynamic IRQ routing discovery method without firmware or hardware changes.

Referring now to FIG. 1, there is shown a block diagram of an exemplary MID platform that conforms to a non-PC/AT architecture, according to an embodiment of the invention. The platform 100 may comprise a central processing hub (CPH) 110 coupled to an input/output hub (IOH) 120. The CPH may have a standard X86 processor core 111 where each processor core may have its own memory controller 113 and cache 115. The CPH may have a variety of other non-processor cores, also called "uncores" 117. The X86 processor core 111 may have an APIC timer 112 which may feed an X86 architecture clock 119.

The IOH 120 is an alternative architecture to existing platforms having an MCH (memory controller hub) and ICH (I/O controller hub). The IOH 120 may be coupled to a standard power management interface controller (PMIC) 150. The IOH 120 may not be PC/AT compatible. The IOH 120 may generate timer signals with a clock generator 121. Various I/O formats and protocols may be used to interface with an external display 122, camera 123, Flash memory 124, GPS 125, etc. The IOH 120 may also have a USB controller 126 to interface with optional peripherals such as for WiFi/WiMax, 3G, Mobile TV, and other networks 127. In an embodiment, the IOH 120 may have system controller unit (SCU) firmware 128. The SCU may be an ARC® microcontroller. In another embodiment, the IOH 120 may have embedded microcode to perform IOAPIC emulation.

The IOH 120 clock generator 121 may be coupled to a crystal clock 130. The IOH 120 may be able to maintain the time regardless of whether the system is up or down because it receives power from the battery in the PMIC 150. The IOH may have eight (8) timers as a part of the clock generator 121.

In embodiments, the IOH 120 may be coupled to the PMIC 150 via an SPI bus 131. Interrupts may be routed via General Purpose Input/Output (GPIO) pins 133.

Figure 2:
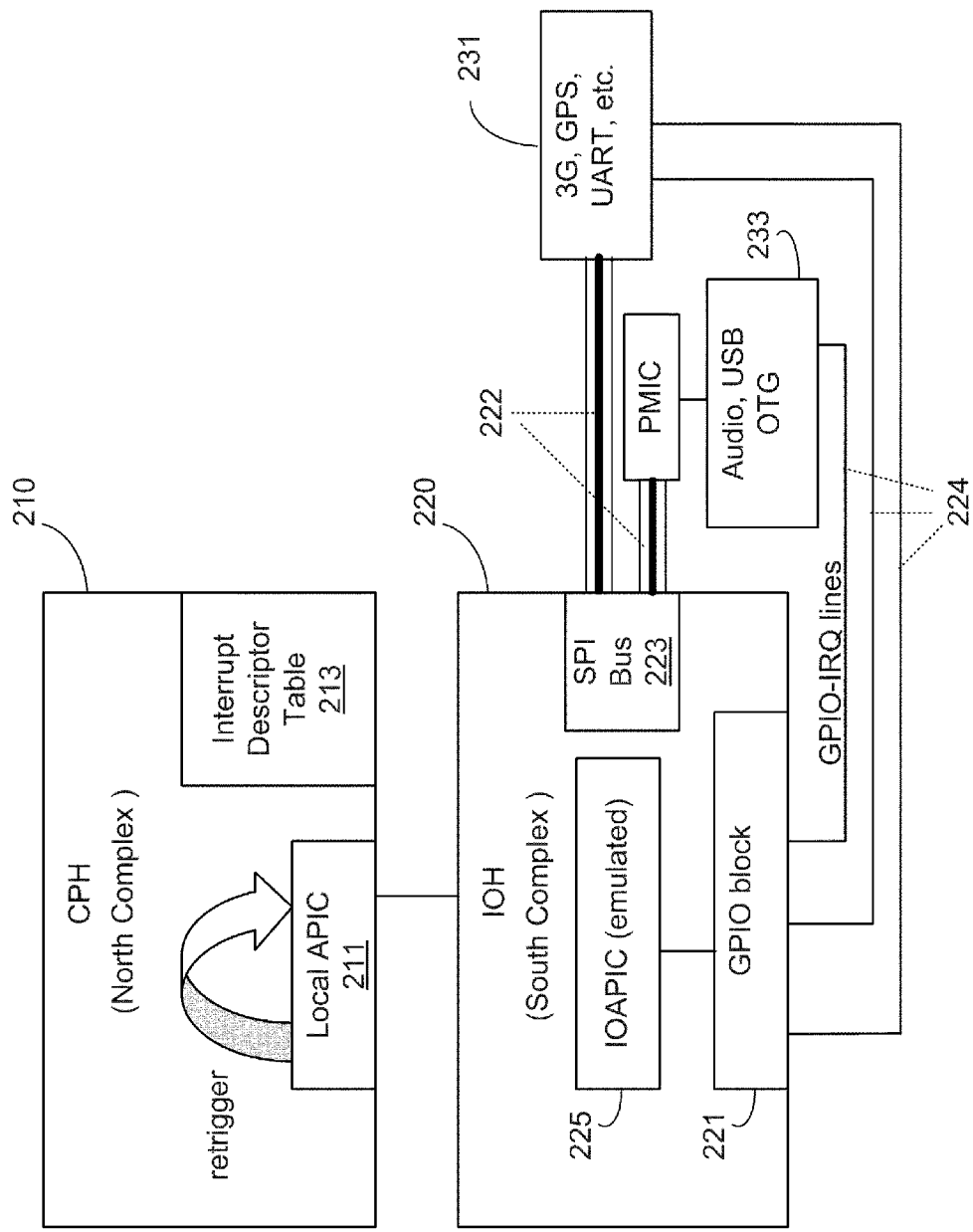
FIG. 2 a block diagram illustrating how peripheral device interrupt pins are routed, according to an embodiment of the invention.

Referring to FIG. 2, there is shown a block diagram illustrating how peripheral device interrupt pins are routed, according to an embodiment of the invention on a mobile Internet device (MID). The CPH 210 is coupled to the IOH 220 via the local APIC 211. The MID may be coupled to a variety of peripheral devices, such as 3G, GPS, UART, (231) and/or Audio, USB and OTG (231). While the peripheral devices are connected to the IOH 220 via data and control lines 222 via the SPI bus 223, their interrupt pins are routed separately via GPIO-IRQ lines 224 which reside on the IOH 220 and are coupled to the GPIO block 221. The GPIO pins are multi-purpose pins which may be arbitrarily assigned by various vendors. The GPIO pins may be multiplexed to the IOAPIC 225 via a single line. An interrupt descriptor table 213 resides in the CPH 210, which may be dynamically updated using embodiments of the present invention.

Figure 3:
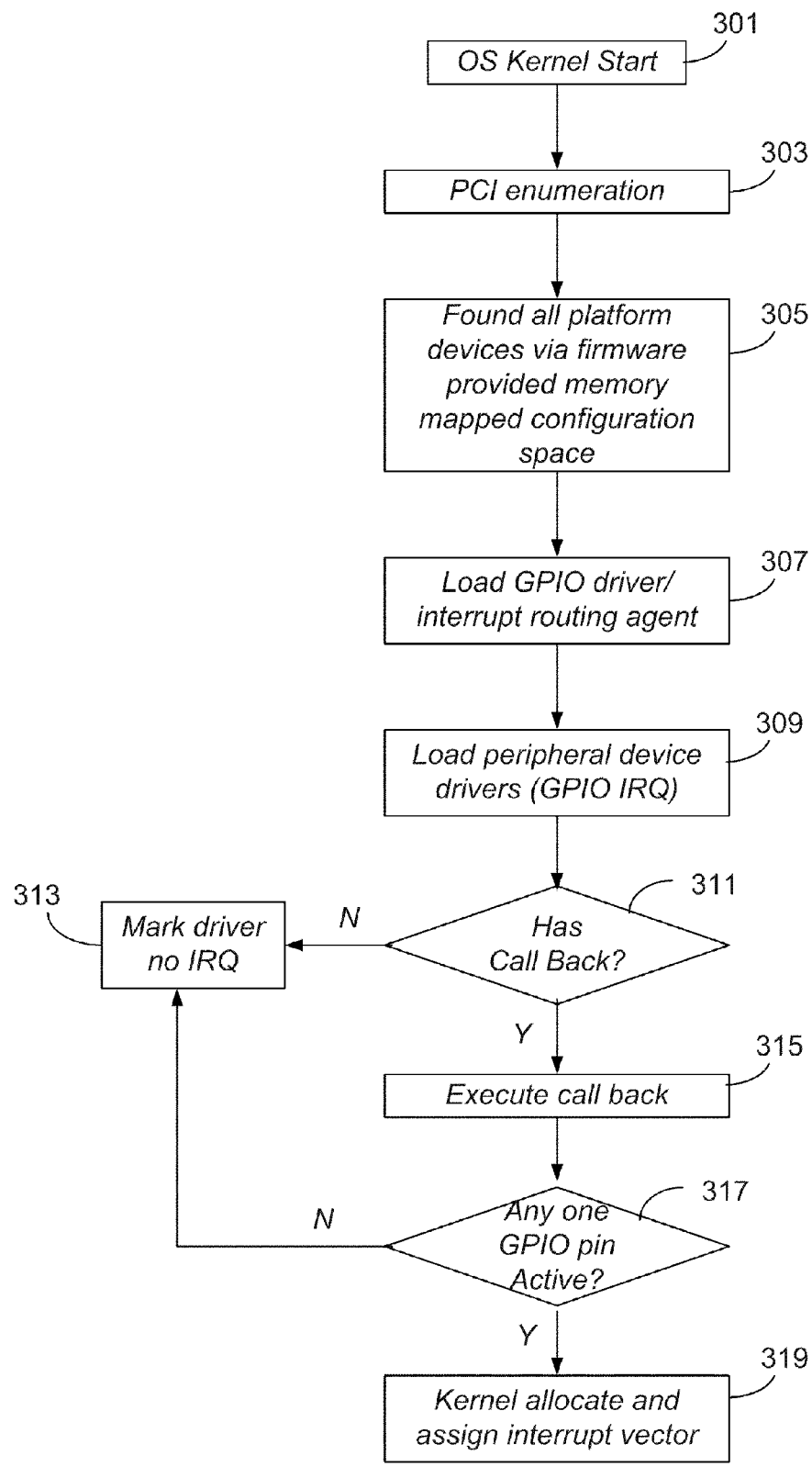
FIG. 3 is a flow diagram illustrating an exemplary Linux kernel boot time GPIO, IRQ, and vector assignment, according to an embodiment of the invention.

Referring now to FIG. 3, there is shown a flow diagram illustrating an exemplary Linux kernel boot time GPIO, IRQ, and vector assignment, according to an embodiment of the invention. In a Linux kernel implementation (such as found at www*moblin*org), embodiments of the invention perform IRQ discovery for PCI devices in three steps. The operating kernel is started in block 301. PCI enumeration occurs in block 303. The kernel performs bus enumeration which finds all peripherals via synthetic PCI buses. The devices list is presented and mapped to configuration space in block 305, 307. The kernel loads the common GPIO driver, which also serve as IRQ routing agent, in block 307. The kernel loads all peripheral device drivers that use GPIO for interrupt service in block 309. This last step is where IRQ routings are established.

The kernel assigns an arbitrary interrupt vector to each device and then asks each driver to register a call back function which performs the interrupt generation. Each driver is queried to determine whether the driver has a call back function, in block 311. If there is no call back function defined for the driver, then the driver is marked as having no IRQ, in block 313. If there is a defined call back function, then the function is executed by the routing agent to ask the device to toggle its IRQ pin, in block 315. Since there is no sharing GPIO-IRQ pin among devices, the kernel can uniquely identify the device that asserted the interrupt, therefore establish the mapping between device and the GPIO pin used for its interrupt. The mapping also includes the unique and arbitrary vector number. The driver execution will communicate to the corresponding device through the SPI data and control lines. If the device is active and connected, it will then actually toggle the pin, which can be detected by the processor. Once the pin is toggled, the IRQ driver can determine which GPIO pin has been assigned to the peripheral device. If the call back function fails to toggle an active pin, for instance for an obsolete driver still in the table, as determined in block 317, then the driver is marked as no IRQ, in block 313. Otherwise, the kernel allocates and assigns the interrupt vector based on the active toggled pin, in block 319. This vector assignment is put into the interrupt descriptor table (FIG. 2, 213). It will be understood that although blocks 311 to 319 are shown a single pass, for simplicity, this process is repeated for each GPIO driver.

It should be understood that embodiments of the invention may be implemented on platforms with multiple processors. In this case, each processor will have its own interrupt descriptor table and local IOAPIC. Each processor has a unique APIC Identifier so that the IRQs are routed to the appropriate processor. Load balancing among the processors may be implemented by appropriately routing the IRQs to a desired processor.

At runtime, after each IRQ is generated and delivered to a corresponding GPIO pin, the GPIO controller serves as the recipient of all IRQs. The GPIO controller driver looks up GPIO pins with pending interrupt status. The driver can determine the interrupt vector based on the pin number. The GPIO controller driver then invokes an inter-processor interrupt (IPI) with the given vector number to local or other processors. The delivery of IPI is via the local APIC which can address different processor configurations such as flat, clustered model. As a result of IPI, a low latency local interrupt will be generated and its vector matches the peripheral device vector, which are assigned during driver initialization. The processing of the interrupt is contained within the peripheral driver without need to interact with the common GPIO block.

The sequence of the end of interrupt (EOI) processing can be orchestrated with the kernel common code. This common kernel code element is important to coordinate with the Linux kernel development community to have common capability in the kernel for embodiments with unique hardware and platform topologies. Embodiments of the invention allow the OS kernel to reuse the same peripheral device drivers without being affected by potential GPIO reassignment for OEM platforms.

Figure 4:
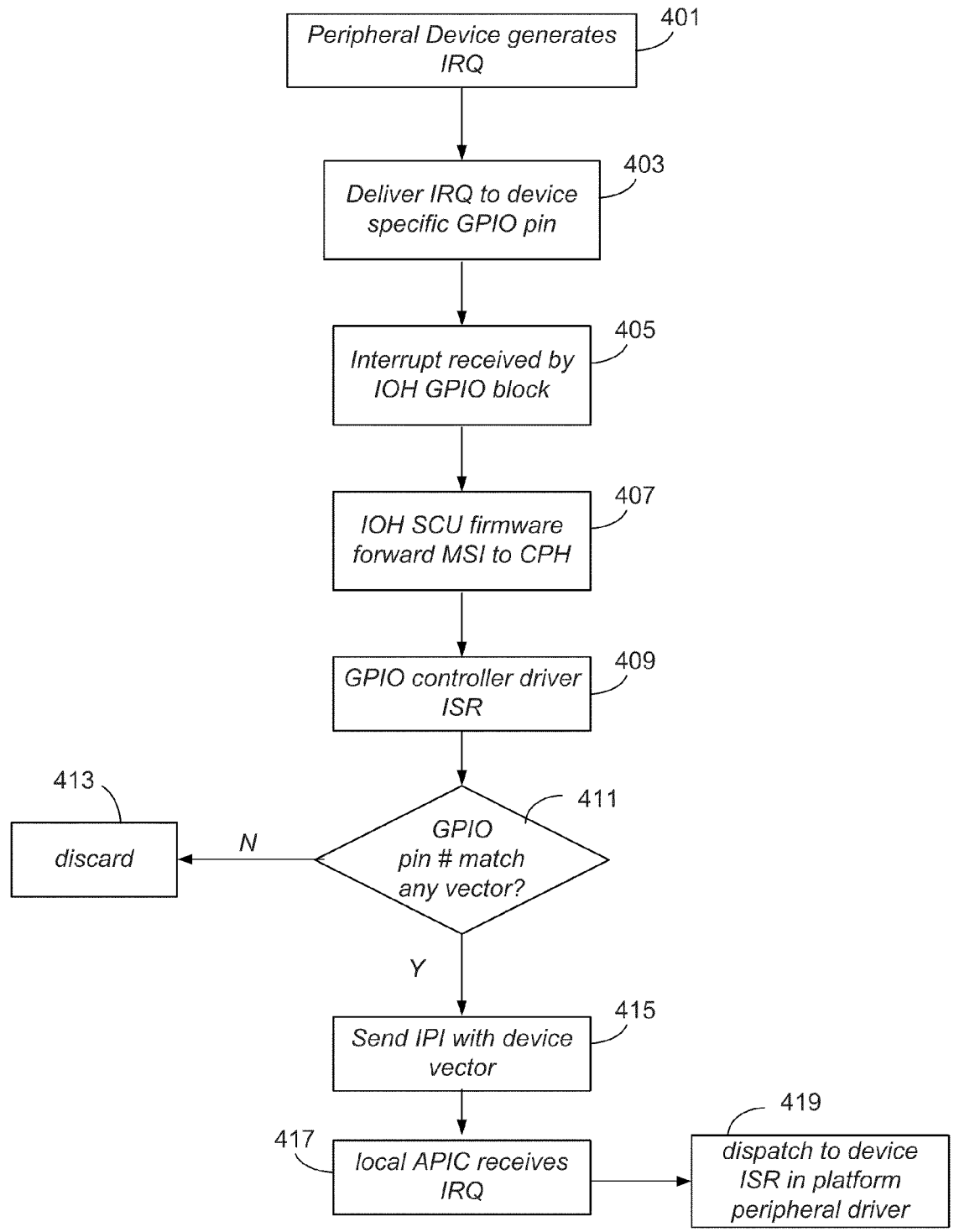
FIG. 4 is a flow chart of an exemplary method for Linux kernel GPIO device interrupt runtime handling during runtime, according to an embodiment of the invention.

Referring now to FIG. 4, there is shown a flow chart of an exemplary method for Linux kernel GPIO device interrupt runtime handling during runtime, according to an embodiment of the invention. During runtime, a device generated an IRQ in block 401. The IRQ is delivered to the appropriate GPIO pin in block 403. The interrupt is received by the IOH block in block 405. The IOH system controller unit (SCU) forwards the message signaled interrupt (MSI) to the CPH for processing, in block 407. The GPIO controller driver ISR executes in block 409.

Each IRQ received will have a unique vector number. Once the IRQ is received by the CPH, the interrupt descriptor table is checked to determine if the GPIO pin number matches any vector in the table, in block 411. If not, the IRQ is discarded as an anomaly in block 413. If the pin number matches a table vector, then the interrupt is retriggered with an inter-process interrupt (IPI) and sent to the appropriate processor with the device vector, in block 415. This retriggering will allow a rebalancing of processing (not shown) by selecting a device to process the interrupt based on processor loads. A rebalancing algorithm may be inserted prior to block 415 to accomplish this. The local APIC on the destination processor receives the IRQ in block 417. The IRQ is then dispatched to the device ISR in the platform peripheral driver, for processing, in block 419.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computing platform comprising:
   a central processing hub (CPH) with one or more processors, wherein each processor includes a local advanced programmable interrupt controller (APIC) and a local interrupt descriptor table;
   an input output hub (IOH) communicatively coupled to the CPH, the IOH including a plurality general purpose input/output (GPIO) pins and an emulated input/output APIC, wherein the GPIO pins are to be coupled to at least one peripheral device, each peripheral device to communicate with the IOH via a serial peripheral interface (SPI) bus; and
   a kernel to execute on at least one of the one or more processors, the kernel configured to include a common GPIO driver serving as interrupt request routing agent, wherein the kernel is further configured to dynamically define interrupt routing information and interrupt descriptor tables for each of the one or more processors based on results of a call back function of discovered GPIO device drivers, and wherein the common GPIO driver is configured to retrigger interrupts received from a requesting device, at run time, as inter-processor interrupts, based on the interrupt descriptor table and identifier of the requesting device, wherein the computing platform is a mobile Internet device having an architecture without PCI pins for interrupt request signals.

2. The computing platform as recited in claim 1, wherein the kernel is configured to dynamically define interrupt routing information and interrupt descriptor tables when at least one of the at least one peripheral device is connected or disconnected from the computing platform.

3. The computing platform as recited in claim 1, wherein the kernel is further configured to determine which GPIO pin is to be used by a peripheral device based on toggling of a GPIO pin as a result of executing the call back function of a discovered GPIO device driver, and wherein the kernel is further configured to define the interrupt routing information and the interrupt descriptor tables for each processor based on the toggled GPIO pin.

4. The computing platform as recited in claim 3, wherein the GPIO driver is configured to retrigger interrupts at runtime by receiving an IRQ from the requesting device, wherein the requesting device and interrupt vector are ascertained by identifying a GPIO pin via which the IRQ is received, and wherein the common GPIO driver is configured to invoke the inter-processor interrupt with the interrupt vector to one of the one or more processors.

5. The computing platform as recited in claim 4, wherein delivery of inter-processor interrupt is via the local APIC of the one or more processors.

6. The computing platform as recited in claim 4, wherein the kernel is further configured to balance work load on the computing platform by selecting a processor of the one or more processors to direct the retriggered inter-processor interrupt for processing of the interrupt received from the requesting device.

7. A computing platform comprising:
a central processing hub (CPH) with one or more processors, wherein each processor includes a local advanced programmable interrupt controller (APIC) and a local interrupt descriptor table;
an input output hub (IOH) communicatively coupled to the CPH, the IOH including a plurality general purpose input/output (GPIO) pins and an emulated input/output APIC, wherein the GPIO pins are to be coupled to at least one peripheral device, each peripheral device to communicate with the IOH via a serial peripheral interface (SPI) bus; and
a kernel to execute on at least one of the one or more processors, the kernel configured to include a common GPIO driver serving as interrupt request routing agent, wherein the kernel is further configured to dynamically define interrupt routing information and interrupt descriptor tables for each of the one or more processors based on results of a call back function of discovered GPIO device drivers, and wherein the common GPIO driver is configured to retrigger interrupts received from a requesting device, at run time, as inter-processor interrupts, based on the interrupt descriptor table and identifier of the requesting device, wherein the kernel is further configured to ignore a device driver during the dynamically defining, when the device driver has no call back function.

8. A computing platform comprising:
a central processing hub (CPH) with one or more processors, wherein each processor includes a local advanced programmable interrupt controller (APIC) and a local interrupt descriptor table;
an input output hub (IOH) communicatively coupled to the CPH, the IOH including a plurality general purpose input/output (GPIO) pins and an emulated input/output APIC, wherein the GPIO pins are to be coupled to at least one peripheral device, each peripheral device to communicate with the IOH via a serial peripheral interface (SPI) bus; and
a kernel to execute on at least one of the one or more processors, the kernel configured to include a common GPIO driver serving as interrupt request routing agent, wherein the kernel is further configured to dynamically define interrupt routing information and interrupt descriptor tables for each of the one or more processors based on results of a call back function of discovered GPIO device drivers, and wherein the common GPIO driver is configured to retrigger interrupts received from a requesting device, at run time, as inter-processor interrupts, based on the interrupt descriptor table and identifier of the requesting device,
wherein the kernel is further configured to mark a device driver as "no IRQ" during the dynamically defining, when the device driver call back function fails to toggle a GPIO pin.

9. A computer implemented method, comprising:
discovering general purpose input/output (GPIO) peripheral device drivers on a computing platform having one or more processors;
loading a common GPIO driver to act as an interrupt routing agent;
loading at least one GPIO peripheral device driver;
executing a call back function for each of the at least one GPIO peripheral device driver having a defined call back function; and
dynamically defining interrupt routing information and interrupt descriptor tables for each of the one or more processors, based on results of the call back function of the discovered general purpose input/output (GPIO) device drivers,
wherein the computing platform is a mobile Internet device having an architecture without PCI pins for interrupt request signals.

10. The method as recited in claim 9, further comprising:
retriggering interrupts received from a requesting peripheral device, at run time, as inter-processor interrupts, based on the interrupt descriptor table and identifier of the requesting peripheral device, the retriggering performed by the common GPIO driver.

11. The method as recited in claim 10, further comprising:
wherein the retriggering further comprises:
receiving an interrupt request (IRQ) from the requesting peripheral device, wherein the requesting peripheral device and interrupt vector are ascertained by identifying a GPIO pin via which the IRQ is received; and
invoking the inter-processor interrupt with the interrupt vector to one of the one or more processors by the common GPIO driver.

12. The method as recited in claim 11, further comprising:
delivering inter-processor interrupts via the local APIC of the one or more processors.

13. A computer implemented method, comprising:
  discovering general purpose input/output (GPIO) peripheral device drivers on a computing platform having one or more processors;
  loading a common GPIO driver to act as an interrupt routing agent;
  loading at least one GPIO peripheral device driver;
  executing a call back function for each of the at least one GPIO peripheral device driver having a defined call back function;
  dynamically defining interrupt routing information and interrupt descriptor tables for each of the one or more processors, based on results of the call back function of the discovered general purpose input/output (GPIO) device drivers; and
  ignoring a GPIO device driver during the dynamically defining, when the GPIO peripheral device driver has no call back function.

14. A computer implemented method, comprising:
  discovering general purpose input/output (GPIO) peripheral device drivers on a computing platform having one or more processors;
  loading a common GPIO driver to act as an interrupt routing agent;
  loading at least one GPIO peripheral device driver;
  executing a call back function for each of the at least one GPIO peripheral device driver having a defined call back function;
  dynamically defining interrupt routing information and interrupt descriptor tables for each of the one or more processors, based on results of the call back function of the discovered general purpose input/output (GPIO) device drivers;
  determining which GPIO pin is to be used by a peripheral device based on toggling of a GPIO pin as a result of executing the call back function of the discovered GPIO device driver; and
  defining the interrupt routing information and the interrupt descriptor tables for each processor based on the toggled GPIO pin.

15. A computer readable storage medium having instructions stored thereon, implemented method, the instructions when executed by a processor on a computing platform cause the processor to:
  discover general purpose input/output (GPIO) peripheral device drivers on the computing platform having one or more processors;
  load a common GPIO driver to act as an interrupt routing agent;
  load at least one GPIO peripheral device driver;
  execute a call back function for each of the at least one GPIO peripheral device driver having a defined call back function; and
  dynamically define interrupt routing information and interrupt descriptor tables for each of the one or more processors, based on results of the call back function of the discovered general purpose input/output (GPIO) device drivers,
  wherein the computing platform is a mobile Internet device having an architecture without PCI pins for interrupt request signals.

16. The medium as recited in claim 15, further comprising instructions to:
  retrigger interrupts received from a requesting peripheral device, at run time, as inter-processor interrupts, based on the interrupt descriptor table and identifier of the requesting peripheral device, the retriggering performed by the common GPIO driver.

17. The medium as recited in claim 16, wherein instructions for retriggering interrupts further comprise instructions to:
  receive an interrupt request (IRQ) from the requesting peripheral device, wherein the requesting peripheral device and interrupt vector are ascertained by identifying a GPIO pin via which the IRQ is received; and
  invoke the inter-processor interrupt with the interrupt vector to one of the one or more processors by the common GPIO driver.

18. The medium as recited in claim 17, further comprising instructions to: deliver inter-processor interrupts via the local APIC of the one or more processors.

19. A computer readable storage medium having instructions stored thereon, implemented method, the instructions when executed by a processor on a computing platform cause the processor to:
  discover general purpose input/output (GPIO) peripheral device drivers on the computing platform having one or more processors;
  load a common GPIO driver to act as an interrupt routing agent;
  load at least one GPIO peripheral device driver;
  execute a call back function for each of the at least one GPIO peripheral device driver having a defined call back function;
  dynamically define interrupt routing information and interrupt descriptor tables for each of the one or more processors, based on results of the call back function of the discovered general purpose input/output (GPIO) device drivers; and
  ignore a GPIO device driver during the dynamically defining, when the GPIO peripheral device driver has no call back function.

20. A computer readable storage medium having instructions stored thereon, implemented method, the instructions when executed by a processor on a computing platform cause the processor to:
  discover general purpose input/output (GPIO) peripheral device drivers on the computing platform having one or more processors;
  load a common GPIO driver to act as an interrupt routing agent;
  load at least one GPIO peripheral device driver;
  execute a call back function for each of the at least one GPIO peripheral device driver having a defined call back function;
  dynamically define interrupt routing information and interrupt descriptor tables for each of the one or more processors, based on results of the call back function of the discovered general purpose input/output (GPIO) device drivers; and
  determine which GPIO pin is to be used by a peripheral device based on toggling of a GPIO pin as a result of executing the call back function of the discovered GPIO device driver; and
  define the interrupt routing information and the interrupt descriptor tables for each processor based on the toggled GPIO pin.

* * * * *